United States Patent
Gregory et al.

[11] 3,902,832
[45] Sept. 2, 1975

[54] MANUFACTURE OF BLOWN FILM

[75] Inventors: Robert B. Gregory, Flemington; Edgar W. Irving, Jr., Glen Gardner, both of N.J.

[73] Assignee: GK Systems, Inc., Flemington, N.J.

[22] Filed: May 9, 1974

[21] Appl. No.: 468,503

[52] U.S. Cl............... 425/72; 425/326 R; 425/466; 264/95
[51] Int. Cl.² ........................................ B29D 23/04
[58] Field of Search.......... 425/72, 326 R, 461, 466, 425/380; 264/95, 209

[56] References Cited
UNITED STATES PATENTS

| | | | |
|---|---|---|---|
| 2,668,323 | 2/1954 | Johnson | 425/326 X |
| 2,926,384 | 3/1960 | Hertz et al. | 425/72 |
| 2,978,748 | 4/1961 | McCauley et al. | 425/380 |
| 3,243,486 | 3/1966 | Pilaro | 425/326 X |
| 3,642,394 | 2/1972 | Geil | 425/72 |
| 3,714,309 | 1/1973 | Biglano | 425/72 X |
| 3,749,540 | 7/1973 | Upmeier | 425/72 X |
| 3,762,853 | 10/1973 | Upmeier | 425/326 |

Primary Examiner—Robert L. Spicer, Jr.
Attorney, Agent, or Firm—Thomas E. Tate

[57] ABSTRACT

The disclosure is that of an invention directed to the substantially increased production of blown film in which an annular extrusion die is provided with internal coaxial tubes for admitting inflating and cooling air to the formed bubble and exhausting volatiles-containing heat-expanded air from the bubble. Separate blowers are provided for inflation and exhaust; and the coaxial tubes are bodily adjustable axially with respect to the die and relatively axially adjustable with respect to each other. Optical quality of the film is improved by removal of haze-causing condensible volatiles.

8 Claims, 1 Drawing Figure

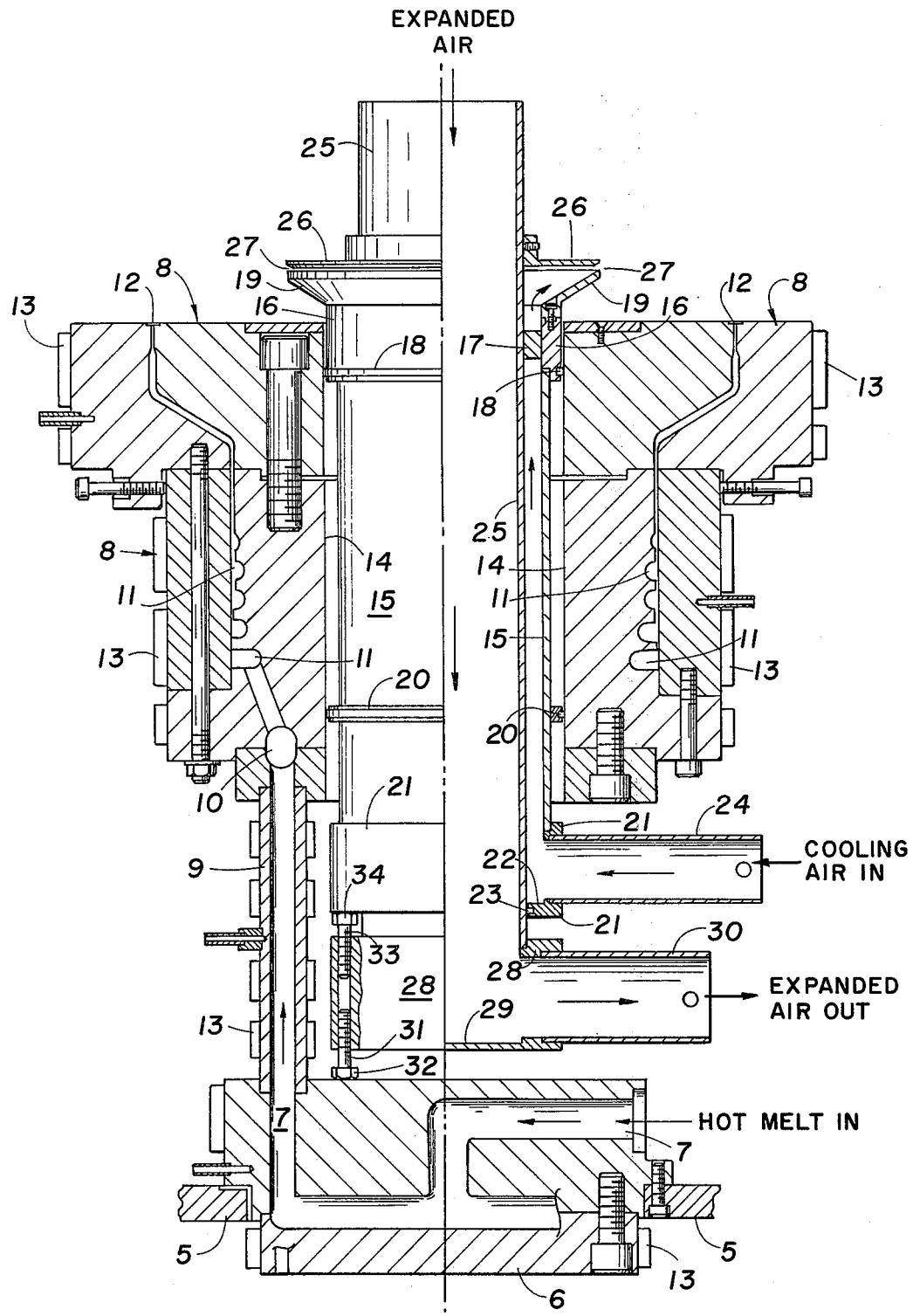

MANUFACTURE OF BLOWN FILM

THE INVENTION

This invention relates generally to new and useful improvements in the production of blown tube plastic films and particularly seeks to provide a novel die and method of producing and internally cooling the blown tube in such a manner that production rates and product quality are markedly increased in comparison with those of prior known devices and methods.

The general principles of manufacturing plastic films by the blown tube method have been known for a substantial number of years and simply comprise extruding a tube of hot melt plastic through an annular die, inflating the tube into a bubble as it leaves the die in order to effect a draw down to the required gauge thickness and to effect cooling hopefully to a non-tacky condition, and then collapsing the tube into a flattened condition by passage through a pair of nip rolls, after which the flattened tube may or may not be slit and opened into a continuous web.

If cooling to a non-tacky condition is not fully or properly effected, the contacting faces of the tube at the nip rolls will block together, thus destroying the usefulness of the tube.

Originally, the blown tubes were only externally cooled, thus necessitating rather slow production rates in order to allow sufficient time for the film to reach a non-tacky or non-blocking condition, since the inner surface portions cooled more slowly than the outer surface portions.

More recently blown tube equipment has been developed in which axially disposed mandrels or their equivalents have been provided to enhance internal cooling, typical examples of which are disclosed in U.S. Pat. Nos. 2,720,680 and 3,445,891. Although such approaches, once successfully put into operation, can achieve a reduction in the time to cool and properly set the blown tube film, it has been observed that they create unexpected problems of their own.

For example, in a system of the general type disclosed in the above mentioned U.S. Pat. No. 2,720,680, the actual bubble size of the "blown" tube is limited by the fixed diameter of the mandrel, which is in contrast to the desired practice of being able to adjust the bubble size to a predetermined width specification of the flattened tube. Also, it is difficult to string-up a bubble around a mandrel at start-up and to avoid either initial or subsequent sticking of the extruded tube thereto. Further, if an air cushion is employed to eliminate contact between the mandrel and the tube, the cooling transfer of heat will be adversely affected.

For further example, while a system of the general type disclosed in the above mentioned U.S. Pat. No. 3,445,181 eliminates the tube-to-mandrel problem, it still is complicated and difficult to string-up a bubble around the core at start-up and cannot avoid condensation of the volatiles released internally of the bubble, which condensation degrades the heat exchange efficiency of the system as well as the optical quality of the film through development of a haze.

Blown film is produced for three major types of products, namely, Converter Film, Bag Film and Shrink Film, for which the production efficiency usually is evaluated by a ratio of pounds per hour per circumferential inch of annular die slot. Evaluation data for representative commercially available blown tube production equipment, not constructed in accordance with this invention, is presented in Table I below.

TABLE I

| Product | Normal | Maximum |
|---|---|---|
| Converter film | 7 PPH/inch | 10 PPH/inch |
| Bag film | 10 PPH/inch | 12 PPH/inch |
| Shrink film | 5 PPH/inch | 12 PPH/inch |

In contrast, equipment constructed in accordance with this invention can achieve a 50% to 100% increase in normal production rates, as presented in Table II below, with ease of initial string-up of the bubble at start-up, substantially no blocking of the flattened tube and improved optical quality, although at the present time, production date for shrink film have not been evaluated, nor have the maximums for all three types of product.

TABLE II

| Product | Normal | Maximum |
|---|---|---|
| Converter film | 14 PPH/inch | Not evaluated |
| Bag film | 16–20 PPH/inch | Not evaluated |
| Shrink film | Not evaluated | Not evaluated |

Therefore, an object of this invention is to provide a novel die and method for producing blown film in such a manner as to substantially increase production rates without causing blocking of the tube upon flattening, internally cooling the film bubble, and continuously removing any released volatiles from the interior of the film bubble, thus improving both heat transfer and final optical quality.

Another object of this invention is to provide a die assembly that includes an annular die having means for continuously admitting inflating and cooling air to the blown plastic bubble adjacent the zone of extrusion in a radially distributed uniform manner and having means for continuously exhausting heat expanded air from the bubble to remove any released condensible volatiles from the interior thereof and to establish and maintain a more efficient heat transfer with respect to the internal cooling of the bubble film.

Another object of this invention is to provide a die assembly of the character stated in which the inflating and cooling air is admitted through an axial tube or sleeve in the die assembly and in which the heat expanded air is exhausted from the bubble through an axial tube or sleeve fitted concentrically within the air admitting sleeve.

Another object of this invention is to provide a die assembly of the character stated in which the air admission and exhaust tubes together may be axially adjusted as a unit to an optimum end position within the bubble adjacent the zone of extrusion and in which the air admission tube may be axially adjusted relative to the exhaust tube, both such adjustments being effected externally of the bubble, thus avoiding destruction of the string-up.

A further object of this invention is to provide a die assembly of the character stated, in which separate variable capacity blowers are employed to supply air to and exhaust heat expanded air from the bubble.

A further object of this invention is to provide a die assembly of the character stated that is simple in design, rugged in construction and economical to manufacture.

With these and other objects, the nature of which will become apparent, the invention will be more fully understood by reference to the drawings, the accompanying detailed description and the appended claims.

The sole FIGURE of the drawing is a vertical transverse section, partly in elevation, of a die assembly constructed in accordance with this invention and showing the concentric and adjustable relationships between the combined inflating and internal cooling air means, the means for exhausting the heat-expanded volatiles-containing air and the annular extrusion die.

Referring to the drawing in detail, the invention, as illustrated, is embodied in a die assembly that is bodily mounted on a horizontal frame plate 5 and includes an adapter 6 having an internal duct or passage 7 for registering connection with a hot melt screw feeder (not shown) and transmission of the extrudate into and through an extrusion die generally indicated 8.

The die 8 is supported above the adapter 6 in spaced relation thereto, and is operably connected therewith by a vertical extrudate transfer tube 9 which connects with an annular passage 10 at the bottom of the die for communication with a multiple turn helical passage 11, of progressively decreasing cross-section and ultimate extrusion of the throughput extrudate through an adjustable annular die slot 12 to form a tube of hot melt plastic which becomes a bubble of blown film upon inflation and cooling as it continuously advances upwardly.

Heating coils, such as those indicated at 13, are employed wherever necessary to maintain and control the temperature of the throughput extrudate.

After the hot melt tube leaves the die slot 12, it is "strung-up" to a pair of upper horizontally disposed nip rolls (not shown) in the normal manner to flatten the tube, during which stringing-up, the tube becomes air inflated to cool the thus formed bubble into a non-blocking set condition and to effect a bubble diameter of the proper size to produce a draw down of the blown film to a predetermined gauge.

The novel features of this invention are particularly directed to the inflating and internal cooling of the blown film bubble and to the properly controlled exhausting of the volatiles-containing heat expanded air from the bubble, which together, as mentioned above, make it possible for this type of die assembly to achieve markedly greater non-blocking production rates than heretofore possible and to improve at least the optical qualities of the finished film.

For these purposes, the die 8 is provided with an axial bore 14 within which an air input tube 15 is slidably mounted and has a diameter somewhat less than that of the bore 14. The upper end of the tube 15 carries an annular extension 16 extending slightly above the upper face of the die 8 and having a medianally positioned internally projecting annular interrupted rib 17, an external seal ring 18 that bears against the wall of the bore 14, and an inverted frusto-conical nozzle element 19 removably secured to its upper face. The tube 15 is also provided with a lower external seal ring 20 which additionally serves to maintain the tube 15 concentric within the bore 14.

An annulus 21, having a bottom inwardly projecting flange 22 carrying a seal ring 23, is affixed to the lower end of the tube 15 and is provided with a plurality of circumferentially spaced radial openings for reception of a corresponding number of radially extending nipples 24 (only one being shown) for connection with a variable capacity source (not shown) of inflating and cooling air, which may be any suitable type of variable speed air blower or pump.

A tube 25 for exhausting the heat expanded air from the film bubble is concentrically mounted within the air input tube 15 for relative axial adjustment with respect thereto, and has its upper end extending above the upper face of the die 8 a distance sufficient to avoid disruption of the effective incoming flow of inflating and cooling air from the tube 15, but not sufficient to cause any difficulty with respect to any "string-up" from the die to the upper nip rolls.

A collar mounted disc 26 is removably affixed to the tube 25 in juxtaposition to the nozzle element 19 and cooperates therewith to define an uninterrupted annular slot 27 for the uniform radially and upwardly directed distribution of the inflating and cooling air.

The upper portion of the exhaust tube 25 is slidably supported by the annular rib 17 and its lower portion is slidably supported by the flange 22 and its associated seal ring 23.

An annulus 28, having a closed bottom 29, is affixed to the lower end of the exhaust tube 25 below the annulus 21 of the air input tube 15 and is provided with a plurality of circumferentially spaced radial openings for reception of a corresponding number of radially extending nipples 30 (only one being shown) for connection with a variable capacity exhaust blower or pump (not shown) of any suitable type.

Since it is both desirable and necessary to properly position the air input slot 27 and the upper end of the exhaust tube 25 with respect to the upper face of the die 8 in order to achieve optimum operating conditions for each type of hot melt plastic and gauge of blown film, means are provided for bodily adjusting both the air input and exhaust tubes relative to the die and for adjusting the air input tube relative to the exhaust tube in order to vary the air flow through the annular slot 27.

For these purposes, the bodily axial adjustment of the two tubes 15 and 25 together is effected by a downwardly extending adjusting screw 31, threadably mounted in the annulus 28, and having a head 32 that bears against the upper face of the adapter 6 and is accessable from outside the unit for bodily adjustment of the two tubes during operation, thus avoiding any need for shutdown and subsequent string-up.

Similarly, the relative adjustment between the two tubes 15 and 25 is effected by an upwardly extending adjusting screw 33, threadably mounted in the annulus 28, and having a head 34 that bears against the lower face of the annulus 21 and also is accessable from outside the unit during operation.

Further, in the event that a change in the angle of impingement from the air slot 27 against the blown bubble need be made, it may be readily effected simply by replacing the nozzle element 19 and/or disc 26 with different corresponding elements of the desired relative configurations, even though any particular installation of such elements may be expected to serve adequately through a relative wide range of bubble size and operating conditions for a given plastic or physicially related group of plastics.

Although it is believed that a clear understanding of the operation of this invention will have been gained from the foregoing description, a brief statement of operation now will be presented.

In operation, the hot melt plastic is admitted to the adapter 6 and extruded in tubular form through the adjustable die slot 12 from which it is "strung-up" to the overlying nip rolls. Simultaneously, inflating and cooling air, at a pressure equivalent to 0.005 – 0.2 inches of water, is introduced from an independent regulated capacity blower through the nipples 24 and discharged through the air slot 27 to inflate the tube to a bubble of the required size and to internally cool same while it is cooled externally by the ambient atmosphere. During internal cooling of the bubble, volatiles from the plastic may be released into the interior thereof, which would tend to condense upon the interior surface to produce a haze on the completed film. Also, heat transfer from the cooled film would cause both expansion and temperature rise of the cooling air, thus reducing the cooling efficiency. Accordingly, once the bubble has been formed upon completion of "string-up", the volatiles-containing expanded air is withdrawn from the bubble through the tube 25 and the nipples 30 by a separate independent regulated capacity exhaust blower. At this stage, the air supply and exhaust blowers are separately adjusted to achieve the optimum operating balance for the particular set of overall operating conditions for the finished gauge of blown film being produced.

It has not been thought to be necessary to illustrate either the air supply or exhaust blower or the controls therefor, since all such components per se are well-known and are commercially available. Also, it has not been thought to be necessary to illustrate the nip rolls above the die assembly, since such nip rolls are commonly used to flatten the blown tubes after the plastics thereof have become cooled.

It is, of course, to be understood that variations in arrangements and proportions of parts may be made within the scope of the appended claims.

We claim:

1. A die assembly for the production of blown film including an extrusion die having an annular extrusion slot and means for supplying hot melt plastic to said extrusion slot whereby to extrude therefrom a continuous tube of unset plastic; independently controlled means mounted within said die for introducing inflating and cooling air to the interior of said extruded tube; and independently controlled means mounted within said die for exhausting heated air from the interior of said extruded tube; said extrusion die being provided with an axial bore at a right angle to the plane containing said annular extrusion slot; said air introducing means including a tube coaxially mounted within said bore and having its upper end arranged for discharge of air into a zone in proximity to the plane of tube extrusion and its lower end arranged for connection to a source of air under pressure; said air exhausting means including a tube coaxially mounted within said air introducing tube and having an outside diameter less than the inside diameter of said air introducing tube whereby to define a void therebetween for the passage of said inflating and cooling air, said air exhausting tube having its upper end terminating in a zone above that of the upper end of said air introducing tube and having its lower end arranged for connection to air withdrawing means.

2. The die assembly of claim 1 in which said coaxially mounted tubes are axially adjustable relative to said extrusion die.

3. The die assembly of claim 1 in which said coaxially mounted tubes are bodily axially adjustable relative to said extrusion die and in which one of said coaxially mounted tubes is axially adjustable relative to the other thereof.

4. The die assembly of claim 3 additionally including means for effecting the bodily axial adjustment of said coaxially mounted tubes relative to said extrusion die; and means for effecting axial adjustment of one of said coaxially mounted tubes relative to the other thereof.

5. The die assembly of claim 1 in which the upper end of said air introducing tube is provided with an annular outwardly diverging element and in which the upper end portion of said air exhausting tube is provided with an annular radially extending element in juxtaposition to said outwardly diverging element, said elements together defining a nozzle for the radial and upward distribution of said inflating and cooling air.

6. The die assembly of claim 3 in which the upper end of said air introducing tube is provided with an annular outwardly diverging element and in which the upper end portion of said air exhausting tube is provided with an annular radially extending element in juxtaposition to said outwardly diverging element, said elements together defining a nozzle for the radial and upward distribution of said inflating and cooling air, the relative axial adjustment between said coaxial tubes being effective to vary the spacing between said elements whereby to increase or decrease the rate of air discharge from said nozzle.

7. The die assembly of claim 6 additionally including means for effecting the bodily axial adjustment of said coaxially mounted tubes relative to said extrusion die; and means for effecting axial adjustment of one of said coaxially mounted tubes relative to the other thereof.

8. The die assembly of claim 7 in which both of said adjusting means are arranged for external access while said die assembly is in operation.

* * * * *